United States Patent [19]

Keller et al.

[11] 4,074,498
[45] Feb. 21, 1978

[54] FABRICATED WOOD BEAM

[75] Inventors: James R. Keller, Tualatin; William A. Nickerson, Portland, both of Oreg.

[73] Assignee: Wm. A. Nickerson & Co., Ltd., Tualatin, Oreg.

[21] Appl. No.: 743,532

[22] Filed: Nov. 5, 1976

Related U.S. Application Data

[63] Continuation-in-part of Ser. No. 558,350, March 14, 1975, Pat. No. 3,991,535.

[51] Int. Cl.² .............................................. E04C 3/02
[52] U.S. Cl. ........................................ 52/690; 52/729; 52/730
[58] Field of Search ................. 52/729, 690, 730, 732, 52/731, 594, 595, 497; 403/364, 282

[56] References Cited

U.S. PATENT DOCUMENTS

| | | | |
|---|---|---|---|
| 1,377,891 | 5/1921 | Knight | 52/729 X |
| 2,981,669 | 4/1961 | Brand et al. | 52/594 UX |

FOREIGN PATENT DOCUMENTS

| | | | |
|---|---|---|---|
| 978,639 | 12/1964 | United Kingdom | 52/729 |

Primary Examiner—Ernest R. Purser
Assistant Examiner—Carl D. Friedman
Attorney, Agent, or Firm—Lee R. Schermerhorn

[57] ABSTRACT

Plywood web members interconnect a pair of chord members by means of glued tongue and groove joints. There are two layers of said web members in face to face relation wherein tongues on the adjacent face veneers occupy a common intermediate groove in each chord member. Tongues on the outer face veneers are bent outward by splayed outer grooves in each chord member to form a self-locking dovetail type joint which holds the members together in assembled relation without external clamps while the glue is setting.

4 Claims, 4 Drawing Figures

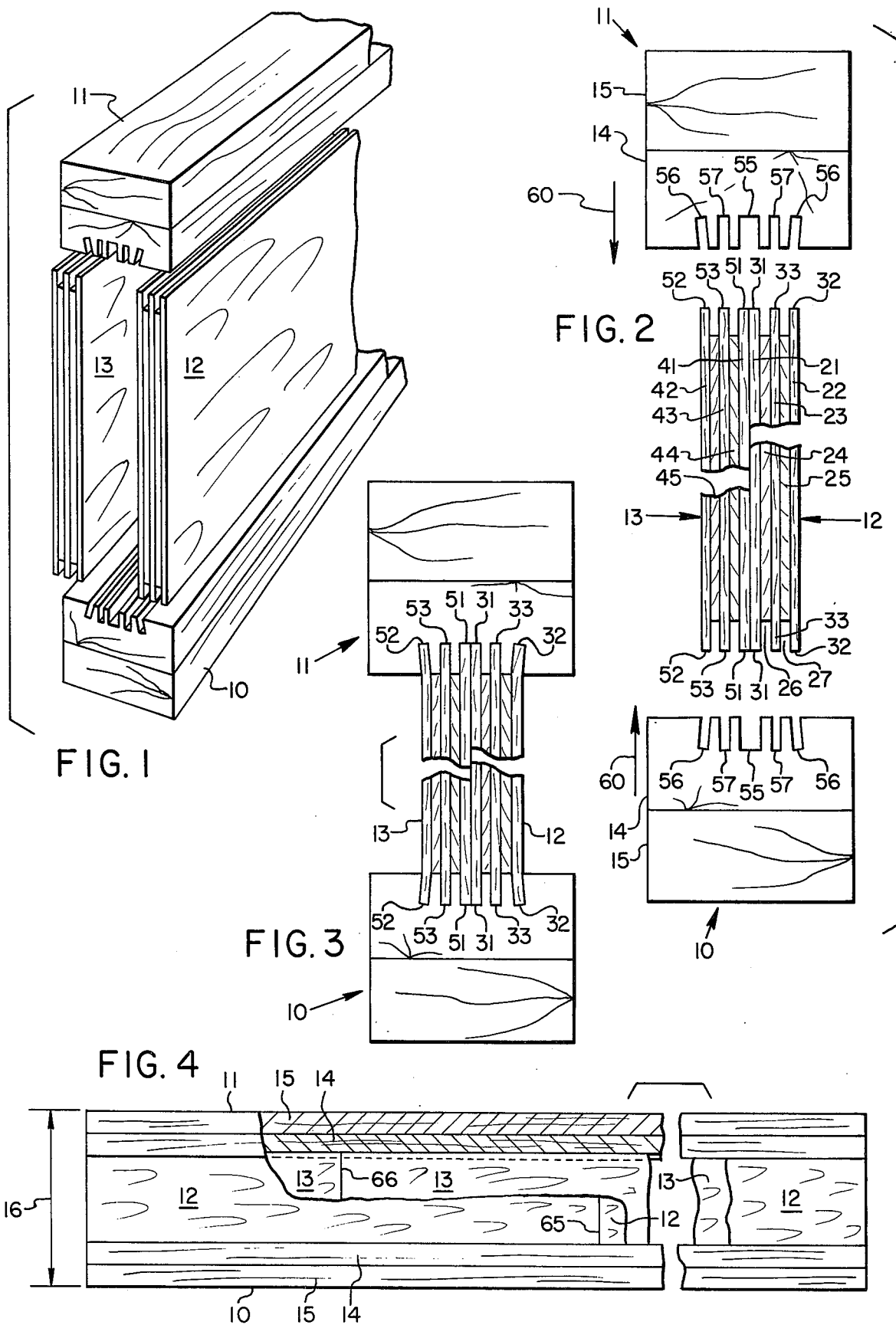

FABRICATED WOOD BEAM

CROSS REFERENCE TO RELATED APPLICATION

This application is a continuation-in-part of Ser. No. 558,350 filed Mar. 14, 1975 for Pressed-In Dovetail Type Joint, now U.S. Pat. No. 3,991,535.

BACKGROUND OF THE INVENTION

This invention relates to an improved wood beam fabricated from a pair of wood chord members and plywood web members interconnecting said chord members by means of glued tongue and groove joints.

The rising cost of sawn lumber in general, and the scarcity of high quality wood capable of producing beams of large size, make it necessary to develop improved processes for fabricating large beams from less expensive and more available wood products. Fabrication also permits more efficient design requiring less wood to make a beam of a given strength. This not only saves wood but also reduces the cost of transportation and facilitates the erection of wooden structures.

Previous attempts to form fabricated wood beams usually require a considerable amount of metal hardware, which hardware involves an additional item of cost as well as time and labor in assembly to attach and secure a multiplicity of fastening devices. On the other hand, known methods of fabricating wood beams by gluing various members together have resulted in a time consuming operation involving external clamps to hold the members together in assembled relation while the glue is setting. Then, if heating means are used to set the glue more quickly, the cost is increased by the amount of heating energy employed.

Objects of the present invention are, therefore, to provide an improved fabricated wood beam, to provide a beam requiring less wood than sawn lumber for supporting a given load, to provide a beam having an improved structural shape and to provide a beam having plywood web members interconnecting a pair of chord members by means of glued tongue and groove joints of a self-locking dovetail type which hold the members together in assembled relation without external clamps while the glue is setting.

SUMMARY OF THE INVENTION

In the present construction plywood web members interconnect a pair of chord members by means of glued tongue and groove joints. There are two layers of said web members in face to face relation wherein tongues on the adjacent face veneers occupy a common intermediate groove in each chord member. Tongues on the outer face veneers are bent outward by splayed outer grooves in each chord member to form a self-locking dovetail type joint which holds all the members together in assembled relation without external clamps while the glue is setting.

The parts are assembled by merely pressing the chord members onto the web members. This is essentially a one step operation which produces at once a finished product in a substantially continuous assembly line type of operation.

The invention will be better understood and additional objects and advantages will become apparent from the following detailed description of the preferred embodiment illustrated on the accompanying drawing. Various changes may be made, however, in the details of construction and certain features may be used without others. All such modifications within the scope of the appended claims are included in the invention.

BRIEF DESCRIPTION OF THE DRAWING

FIG. 1 is a perspective view showing the web and chord members used to fabricate a wood beam according to the invention.

FIG. 2 is an end view with parts broken away showing the members assembled prior to the pressing operation.

FIG. 3 is a similar view showing the assembled beam.

FIG. 4 is a side elevation view of the beam with parts broken away.

DESCRIPTION OF THE PREFERRED EMBODIMENT

As shown in FIG. 1 the members to be assembled to make the present beams are a lower wood chord member 10, an upper wood chord member 11 and a pair of plywood web members 12 and 13. In order to develop the desired strength two web members are assembled face to face as shown in FIG. 2. There is no necessity for gluing or otherwise securing web members 12 and 13 together but they may be secured together if desired.

For the present purpose it is preferred to use a sheet of five ply plywood for each web member 12 and 13. Where the strength requirements are less severe three ply plywood sheets may be used. In the present illustration each web member 12 and 13 is a piece of plywood ⅝ inch thick containing five layers of veneer each ⅛ inch thick. Chord members 10 and 11 are 3 inches by 3½ inches. For economy of construction each chord member is preferably assembled from two pieces of 1½ inch by 3½ inch lumber 14 and 15 glued together as shown.

The depth of the beam as measured by dimension line 16 in FIG. 4 is 15¼ inches and the overall length of the beam is 18½ feet, or 222 inches. Such a beam when used for a garage door header, for example, may be supported at its ends with a clear span of up to 216 inches between the supports. This beam passes the load tests required of a 4 inch by 16 inch solid wood beam made of the highest grade lumber although the present fabricated beam contains considerably less wood.

The foregoing dimensions are given by way of example only and in no way limit the scope of the invention.

Referring back to FIG. 2, the plywood web member 12 has vertical grain face veneers 21 and 22 and a vertical grain core veneer 23. Core veneers 24 and 25 have horizontal grain. The upper and lower edges of the web member are grooved at 26 and 27 to recess the edges of the horizontal grain veneers 24 and 25. Thus, face veneer 21 forms tongues 31 on the upper and lower edges of the web member, face veneer 22 forms similar tongues 32 and core veneer 33 forms similar tongues 33.

In a similar manner, web member 13 has vertical grain face veneers 41 and 42 and a vertical grain core veneer 43. Core veneers 44 and 45 have horizontal grain and are recessed on the upper and lower edges of the web member to provide tongues 51, 52 and 53.

Upper chord member 11 has a central or intermediate groove 55 to receive the tongues 31 and 51 and a pair of outer grooves 56, 56 to receive the tongues 32 and 52. Additional grooves 57, 57 receive the tongues 33 and 53. The entrance portions of all of these grooves are positioned to register with the respective tongues so that the tongues will enter the grooves when chord members 10 and 11 are pressed onto web members 12 and 13 as indicated by arrows 60. The width of grooves 56 and 57 corresponds to the thickness of tongues 32, 33, 52 and 53 and the width of groove 55 corresponds to the combined thickness of tongues 31 and 51.

Outer grooves 56, 56 are splayed or inclined away from each other from top to bottom at angles of approximately 5° from the vertical to bend tongues 32 and 52 outward in a self-locking dovetail type joint. Grooves 55, 57, 57 are disposed in the vertical planes of tongues 31, 51, 33 and 53.

Lower chord member 10 has grooves 55, 56, 56, 57, 57 indentical to those just described in upper chord member 11.

All the tongues 31, 32, 33, 51, 52, 53 are coated with glue before the chord members are pressed onto the web members. The bending of tongues 32 and 52 forms a self-locking dovetail type joint which holds the chord and web members together in assembled relation without external clamps while the glue is setting. The bent positions of these tongues also increase the strength of the joint independently of the adhesive power of the glue. Chord members 10 and 11 may be disposed in non parallel relation to make a triangular truss, if desired.

Since the length of the beam in FIG. 4 exceeds the width of any available plywood panels it is necessary to employ a plurality of the web members 12 and plurality of the web members 13. Thus, adjacent web members 12 abut each other in edge to edge relation on vertical abutment lines 65 and adjacent web members 13 abut each other in edge to edge relation on vertical abutment lines 66. The beam is further stiffened by staggering or offsetting the abutment lines 65 and 66 so that they do not lie opposite each other.

What is claimed is:

1. A fabricated wood beam comprising a pair of wood chord members and plywood web members interconnecting said chord members by means of glued tongue and groove joints, said web members comprising two sheets of plywood in face to face juxtaposition with the grain of the wood in the face veneers of both sheets running approximately perpendicular to the length of the chord members, each sheet having at least one intervening layer of veneer in which the grain of the wood runs approximately parallel with the length of said chord members, said face veneers projecting beyond said intervening layers on two opposite edges of said web members to form tongues on each of said opposite edges, longitudinal grooves in each of said chord members spaced apart to receive said tongues, said grooves in each chord member comprising a pair of outer grooves each having a width corresponding to the thickness of an outer face veneer on said web members to receive said outer face veneers, said outer grooves being inclined from top to bottom relative to each other to bend said outer face veneers on said web members out of parallelism with each other and form a self-locking dovetail type joint when said chord members are pressed onto said web members and said grooves including an intermediate groove having a width corresponding to the combined thickness of the adjacent face veneers on said web members to receive both of said adjacent face veneers on said two web members, said bent outer face veneers holding all of said members together in assembled relation without external clamps while the glue in said joints is setting.

2. A beam as defined in claim 1, each of said plywood web members comprising a five ply sheet having a center core veneer with the grain of its wood running in the same direction as in said face veneers, said center core veneer in each of said web members forming additional tongues on each of said two opposite edges of the web member between said tongues on said face veneers and said grooves in said chord members including additional grooves to receive said additional tongues.

3. A beam as defined in claim 2, said intermediate and additional grooves in each chord member being parallel with said veneers to receive the respective tongues without bending said tongues.

4. A beam as defined in claim 1, said web members comprising a first series of said plywood sheets abutting each other edge to edge in abutment lines on one face of the beam and a second series of said plywood sheets abutting each other edge to edge in abutment lines on the opposite face of the beam which are offset between said abutment lines on said one face of the beam.

* * * * *